United States Patent [19]
Hegg et al.

[11] Patent Number: 5,264,913
[45] Date of Patent: Nov. 23, 1993

[54] REDUCED COMBINER HELICOPTER SIGHT SYSTEM

[75] Inventors: Ronald G. Hegg, Los Angeles; Mao-Jin Chern, Rancho Palos Verdes, both of Calif.

[73] Assignee: Hughes Aircraft Company, Los Angeles, Calif.

[21] Appl. No.: 677,220

[22] Filed: Mar. 29, 1991

[51] Int. Cl.$^5$ .............................................. C02B 23/10
[52] U.S. Cl. ................................................ 356/251
[58] Field of Search .......................... 356/251–252, 356/394, 142; 350/174; 33/14; 340/705

[56] References Cited

U.S. PATENT DOCUMENTS 3,137,769  6/1964  Yates et al. ........................ 350/174

Primary Examiner—Richard A. Rosenberger
Assistant Examiner—K. P. Hantis
Attorney, Agent, or Firm—L. A. Alkov; W. K. Denson-Low

[57] ABSTRACT

A helicopter sight system including an illuminated reticle for controllably providing reticle imaging illumination and an active display for controllably providing active display illumination that contains alignment information provided by an electronic aiming system, the active display and the reticle being controlled to provide respective imaging illumination at different times. The reticle illumination and the active display illumination are directed by a color beam combiner along a common axis to a focussing lens system which illuminates a transparent combiner to produce a reticle image and an active display image viewable by the operator of the helicopter. The focussing lens system, the reticle, and the active display are configured so that the reticle image is positioned at optical infinity and the active display image is positioned at less than optical infinity, whereby the reticle image is positioned at a relatively long optical distance so that the focus of the reticle image sufficiently matches the relatively long distance to the target, and whereby the eyebox for viewing the active display image is larger than the eyebox for viewing the reticle image. More particularly, the reticle is positioned at a distance from the focussing lens system that is equal to the focal length of the focussing lens, and the active display is positioned at a distance from the focussing lens system that is less than the focal length of the focussing lens.

4 Claims, 2 Drawing Sheets

REDUCED COMBINER HELICOPTER SIGHT SYSTEM

BACKGROUND OF THE INVENTION

The disclosed invention is directed generally to helicopter target alignment sights, and is directed more particularly to a fixed position helicopter alignment sight that provides for pilot visual alignment of the helicopter with a target by reference to a reticle image produced by a reticle image source and for subsequent electronically guided alignment of the helicopter with the target by reference to an alignment image produced by an alignment image source.

Helicopter target alignment sights are utilized to align a helicopter with a target such that deployment of a helicopter carried weapon such as a rocket will result in hitting the target. Such alignment basically includes visual alignment by the pilot, and then subsequent alignment pursuant to information provided by an electronic guidance means such as a laser range finder.

In particular, the helicopter is maneuvered by visual reference to the target so that its alignment is close to the desired alignment, and then the electronic guidance means provides for electronically guided alignment. Visual alignment typically involves proper alignment of pilot's eyes with respect to some type of reference such as a reticle, and then visual alignment of the helicopter with the target by reference to the reticle. After the helicopter is visually aligned with the target such that the electronic guidance means will properly detect and track the target, the electronic guidance system then provides the pilot with information to achieve the appropriate aim alignment that takes into account factors such as trajectory of the rocket.

A known sight system is directed to a single optical sight system that could be utilized for visual alignment and electronic alignment. However, that system includes movable components that require precision motors.

SUMMARY OF THE INVENTION

It would therefore be an advantage to provide a helicopter sighting system that is stationary with respect to the helicopter and provides for visual alignment and electronic alignment.

The foregoing and other advantages are provided by the invention in a helicopter sight system that includes an illuminated reticle for controllably providing reticle imaging illumination and an active display for controllably providing active display illumination that contains alignment information provided by an electronic aiming system, the active display and the reticle being controlled to provide respective imaging illumination at different times. The reticle illumination and the active display illumination are directed by a color beam combiner along a common axis to a focussing lens system which illuminates a transparent combiner to produce a reticle image and an active display image viewable by the operator of the helicopter. The focussing lens system, the reticle, and the active display are configured so that the reticle image is positioned at optical infinity and the active display image is positioned at less than optical infinity, whereby the reticle image is positioned at a relatively long optical distance so that the focus of the reticle image sufficiently matches the relatively long distance to the target, and whereby the eyebox for viewing the active display image is larger than the eyebox for viewing the reticle image. In particular, the reticle is positioned at a distance from the focussing lens system that is equal to the focal length of the focussing lens, and the active display is positioned at a distance from the focussing lens system that is less than the focal length of the focussing lens.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
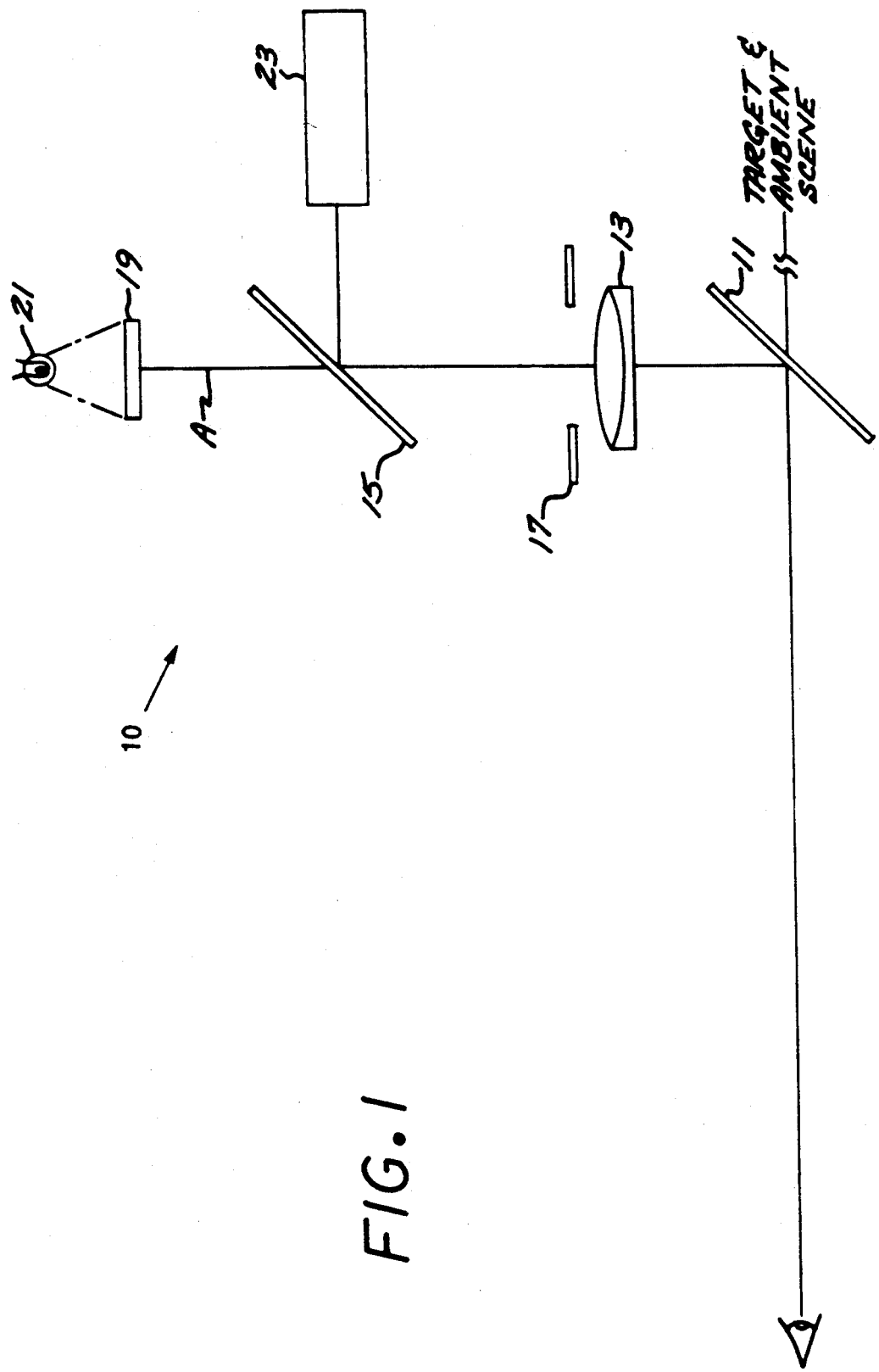
FIG. 1 is schematic block diagram of a sight system in accordance with the invention.

In the following detailed description and in the several figures of the drawing, like elements are identified with like reference numerals.

FIG. 1 illustrates a sight system 10 that includes a focussing lens 13 and a planar combiner 11 is below the lens 13 and tilted 45 degrees relative to the focussing lens axis A on which the combiner is centered. A color beam combiner 15 is located above the focussing lens 13 parallel to the planar combiner 11 and is centered on the focussing lens axis A. A color selective aperture 17, or an adjustable mechanical aperture is located above the focussing lens 13 and below the color beam combiner 15.

A reticle 19 and an LED illumination source 21 provide reticle illumination from above the color beam combiner 15 and along the focussing lens axis A. An active display source 23 comprising a cathode ray tube (CRT) or a back-lit liquid crystal display (LCD) matrix, for example, provides display illumination along an axis that is 45 degrees relative to the color beam combiner 15 and coplanar with both the focussing lens axis A and the normal to the color beam combiner 15. As will be discussed in further detail herein, only the reticle illumination or the active display illumination is on at any given time. The color beam combiner 15 functions to direct the reticle illumination or the active display illumination along the focussing lens axis.

It should be appreciated that the described angular orientations of the combiner 11 and the color beam combiner 15 are illustrative examples, and that other angles would be utilized depending on considerations such as packaging constraints. For example, the combiner 11 could be at 40 degrees relative to the axis A, in which case the optical system above the combiner would be tilted back from vertical, assuming that the line of sight from the pilot's eye to the combiner 11 remains horizontal.

The focussing lens 13, which by way of example comprises a magnifying lens, provides different functions for the reticle and for the active display. The reticle image is positioned at optical infinity (by locating the reticle at a distance from the focussing lens that is equal to the focal length of the focussing lens) so that the focus of the reticle image sufficiently matches the relatively long distance to the target, whereby the parallax error between the reticle and the target is smaller than the aiming system accuracy requirements. In other words, the reticle image is positioned at a relatively long optical distance so that the pilot's eye can simultaneously focus on the target and the reticle image. The image source of the active display is positioned in from optical infinity so as to provide for a larger eyebox for viewing the active display image. As discussed further herein, when the active display is being utilized, the pilot's eye needs to focus on only the active display image.

The components of the sight system are mounted in helicopter in fixed relation to the airframe and are configured so as to aligned with a laser rangefinder which is also mounted in fixed relative to the airframe.

By way of illustrative example, planar combiner 11 comprises a transparent substrate with a partially reflective, partially transmissive coating (dielectric, for example) that provides 30% broadband reflection and 70% broadband transmission, for example. The color beam combiner 15 comprises, for example, a color selective combiner that reflects green and transmits red, for example. For that particular color beam combiner, the LED source is red so that the reticle illumination is transmitted by the color beam combiner, and the CRT output is green so that the display illumination is reflected by the color beam combiner.

By way of illustrative example, the focussing lens 13 is a doublet that is well corrected at a relatively low speed for accuracy when the reticle illumination is being utilized (e.g., an accuracy of 1 milliradian may be required to properly overlay the image of the reticle with the target), but has a diameter that is larger than the F-number for which it is well corrected. The color selective aperture filter substantially limits the reticle illumination to the low speed F-number while allowing the display illumination from the CRT to pass through a larger aperture. Alternatively, an adjustable mechanical aperture can be substituted for color selective aperture filter, in which case the aperture is adjusted to be smaller (lower speed F-number) when the reticle illumination is on, and is adjusted to be larger (higher speed F-number) when the display illumination is on.

A faster focussing lens could be used so as to eliminate the color selective aperture filter, but a faster lens would be more complex in order to provide the same accuracy as a stopped down well corrected doublet.

Figure 2:
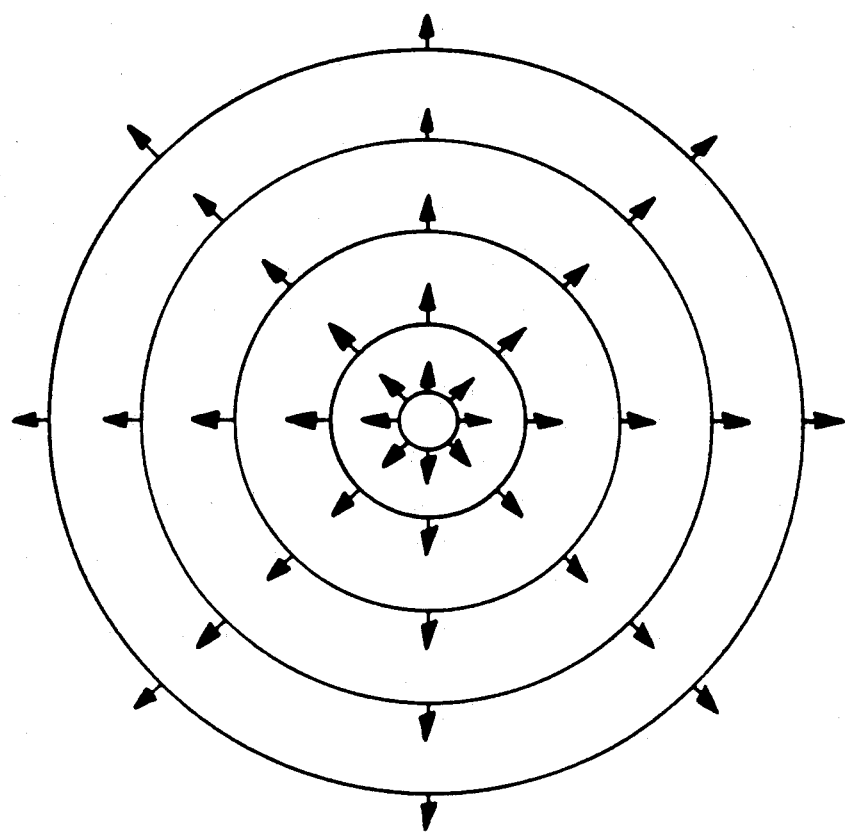
FIG. 2 is an illustrative example of a reticle pattern that can be utilized with the sight system of FIG. 1.

FIG. 2 depicts an illustrative example of a reticle pattern for the reticle 19. The reticle pattern comprises a plurality of concentric circles and outwardly pointing arrows. Only a portion of the reticle pattern is visible at any one time, and the size of the visible portion is generally the size of the inner most "bulls eye". When viewed, the direction of the arrow(s) in the portion of the reticle pattern that is visible indicates the direction of head movement necessary to fully see the center "bulls eye". The arrows on the pattern are directed outwardly since an outside portion of the reticle will be seen when the eye is at a diametrically opposite location. Thus, movement in the direction indicated by the visible arrows will bring the eye to the position from which the center of the reticle can be seen.

The sight system 10 is utilized to (1) align the helicopter with the target to allow an electronic range finder (i.e., acquire the target), and (2) position the helicopter for firing. The first step is performed with the reticle illumination on and with the focussing lens 13 at a smaller aperture for accuracy. The second step is performed with the display illumination on and with the focussing lens 13 at a larger aperture for a larger eyebox.

The pilot looks through the combiner 11 with one eye from a comfortable distance of about 6 inches, for example. As he looks through the combiner, he will be able to see the ambient scene together with some portion of the sighting reticle. Since the combiner and primary focus lens were purposely made small (to decrease the unit size and increase performance), the pilot might not see the center of the reticle (which is being vignetted by the combiner and the lens). In the event the portion of the reticle image seen by the pilot is off center, the image will include directional arrows that indicate the direction of head movement necessary to see the center of the reticle image. As the pilot moves his head in the direction indicated by the arrows, his eye moves closer and closer to the proper position for aiming. Once he can see the center of the reticle, he is assured that his head is in the proper location for aiming and that the accuracy of the reticle optics is true.

Once the helicopter pilot has moved his head such that the one eye can see the center of the reticle, he then maneuvers the helicopter so as to overlay the reticle center on the target. The primary focus lens produces a virtual image of the reticle at optical infinity so that there is no parallax between the reticle and target. Once he has positioned his helicopter, the laser rangefinder can be activated with the knowledge that the laser, being boresighted with the reticle optics, will strike the target. The return information from the laser reflection (i.e., range and line-of-sight) will be received by the targeting system.

The targeting system will then compute (very quickly) how the helicopter should be oriented so that a rocket can be fired from the helicopter to hit the target. The rocket does not have a line-of-sight trajectory and is not a "smart" weapon. Its accuracy therefore is based on the computed trajectory information and the ability of the pilot to orient the helicopter in the correct position for firing.

The pilot accomplishes the task of properly positioning the helicopter for firing by using the active display of the sight optical system. At this point, the reticle is not needed (since it is only used for aiming the laser range finder) and the lamp or LED that illuminates the reticle will be turned off. The miniature CRT will be activated and its information will be displayed to the pilot through the focussing lens 13 and off the combiner 11.

By way of illustrative example, the active display shows the pilot a stationary cross hair in the center of the display and movable cross hair. The stationary cross hair represents the final position of the helicopter for firing, while the movable cross hair represents the current position of the helicopter. By maneuvering the helicopter, the pilot will see the second cross hair move around the display and intent is to move the movable cross hair until it overlays the first one. When the movable cross hair overlies the stationary cross hair, the helicopter is in the proper position for firing a rocket as determined by the firing computer.

During the aiming phase when the active display is utilized, the pilot need not be concerned with the target during this time since the helicopter positioning is to be in accordance with the active display. Therefore, the active display need not be at optical infinity, nor does the accuracy of active display require 1 milliradian precision. Both cross hairs are subjected to the same optical aberrations since they are coming through the same optical system means, and the relative location between them will not be altered by absolute accuracy problems. As a result of the different requirements for the active display imaging, the active display can include optical components different from the reticle system.

As indicated previously, the active display source is positioned at less than optical infinity, which provides for a larger eyebox. The size of the eyebox is further increased by use of a larger aperture (faster F-number) for the focussing lens. With the resulting relatively large eyebox, the pilot can move his head relative to the combiner and still see the full active display. The larger eyebox advantageously allows the pilot to see the full active display image while his head is being moved as a result of quick maneuvering of the helicopter to position it for firing, where such head movement might move the pilot's eye from the sensitive, small central eye box required for aiming. Further, the larger eye box will allow the pilot freedom to view other things and still see the active display image.

By way of illustrative example, the sight system of FIG. 1 can be configured as follows. The combiner 11 is located so as to be 6 inches from the center of the eyebox that is an axis orthogonal to the focussing lens axis A and in the plane formed by the axis A and the normal to the combiner 11. The focussing lens 13 is positioned 2 inches above the combiner 11 so as to provide a practical eye relief of 8 inches from the eye to the lens. For the guidelines that the eyebox for the sight reticle should be about 1 inch in diameter and that the pilot should be able to see at least the center of the reticle from anywhere within the eyebox, the minimum diameter of the focussing lens should also be 1 inch. For accuracy, the minimum F-number of the lens should be 3, for which the focal length of the lens would be 3 inches, and the reticle is positioned 3 inches above the focussing lens. If overall eye motion region from which any portion of the reticle is viewable is 3 inches in diameter, the overall field of view of the reticle image would have to be a minimum of 14.25 degrees. For that field of view, the reticle size is 0.75 inches in diameter, and the instantaneous field of view of any portion of the reticle image as viewed from anywhere within the overall eye motion region would be 7.15 degrees.

The color beam combiner 15 is located half way between the focussing lens 13 and the reticle 19 (i.e., 1.5 inches above the lens), and since the focussing lens 13 does not need to collimate the image of the active display source, the image distance can be set to 30 inches from the eye. This provides for a back focus distance of 2.64 inches, and therefore the screen of the active display is positioned 1.1 inches from the color beam combiner 15. If the field of view of the active display source is 5 degrees and the effective aperture of the focussing lens is allowed to be enlarged from F/3 to F/1.5 when used with the active display source illumination (with a selective filter or mechanical aperture as discussed above), then the eyebox will expand from 1 inch in diameter for the reticle to 1.77 inches in diameter to see all of the 5 degree active display. For an increased speed of F/1.5, the focussing lens would have to be 2 inches in diameter for the 3 inch focal length. The image source size would be 0.31 inches in diameter, which can be easily accommodated by a ¼ inch high brightness CRT, for example.

The foregoing has been a disclosure of a helicopter sight system that advantageously includes the two functions of target sighting and equipment firing in a compact sight system that is rigidly mounted relative to the helicopter airframe.

Although the foregoing has been a description and illustration of specific embodiments of the invention, various modifications and changes thereto can be made by persons skilled in the art without departing from the scope and spirit of the invention as defined by the following claims.

What is claimed is:

1. A helicopter sight system for use in positioning a helicopter relative to a target with information provided by an electronic aiming system, comprising:

reticle means for controllably providing reticle imaging illumination using a reticle pattern;

active display means for controllably providing active display illumination that contains alignment information provided by the electronic aiming system, said active display means and said reticle means controlled to provide respective imaging illumination at different times;

illumination directing means for directing said reticle imaging illumination and said active display illumination along a common optical path; and focusing means responsive to said illumination directing means to produce a reticle image and an active display image viewable by the operator of the helicopter, wherein said focusing means comprises a lens system that is well corrected at a relatively low speed for accuracy when reticle illumination is being utilized, and aperture means for limiting the reticle imaging illumination to pass through the aperture means corresponding to said well corrected lower speed central portion and said active display illumination to pass through the aperture means corresponding to a portion of the lens system that is larger than said well corrected lower speed central portion;

said focussing means, said reticle means, and said active display means configured so that the reticle image is positioned at optical infinity and the active display image is positioned at less than optical infinity, whereby the reticle image is positioned at a relatively long optical distance so that the focus of the reticle image sufficiently matches the relatively long distance to the target, and whereby an eyebox for viewing the active display image is larger than an eyebox for viewing the reticle image.

2. The helicopter sight system of claim 1 wherein said reticle image means provides reticle imaging illumination of a first predetermined color and alignment image means provides alignment imaging illumination of a second predetermined color, and wherein said illumination directing means comprises a beam splitter that transmits said first predetermined color and reflects said second predetermined color.

3. The helicopter sight system of claim 2 wherein said aperture means is a color selective filter.

4. The helicopter sight system of claim 2 wherein said aperture means is a mechanically adjustable aperture.

* * * * *